Dec. 13, 1927.
M. A. WHITING
1,652,969
AUTOMATIC SUBSTATION CONTROL EQUIPMENT
Filed Sept. 15, 1922
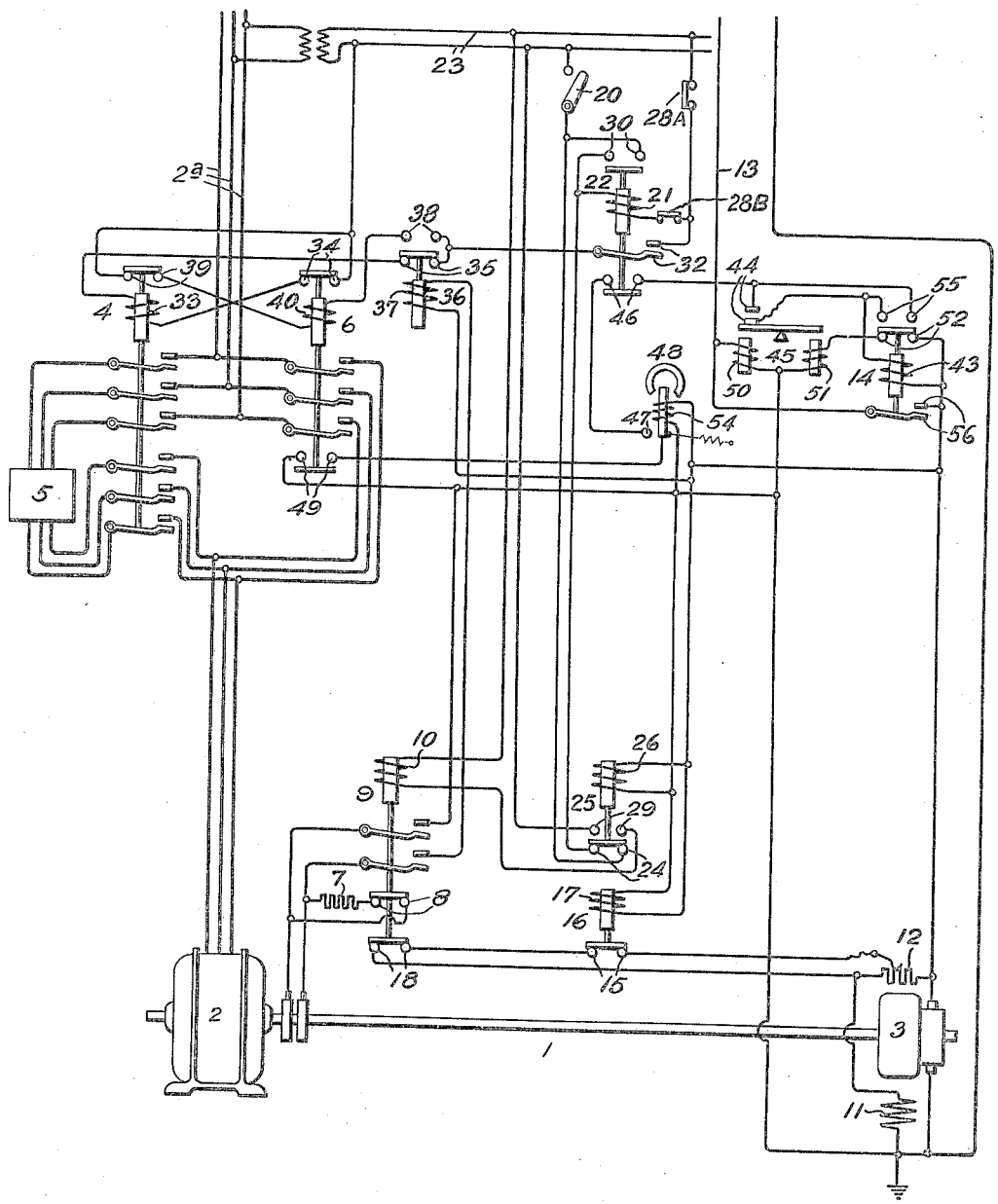
Inventor:
Max A. Whiting,
by His Attorney.

Patented Dec. 13, 1927.

1,652,969

UNITED STATES PATENT OFFICE.

MAX A. WHITING, OF SCHENECTADY, NEW YORK, ASSIGNOR TO GENERAL ELECTRIC COMPANY, A CORPORATION OF NEW YORK.

AUTOMATIC SUBSTATION CONTROL EQUIPMENT.

Application filed September 15, 1922. Serial No. 588,417.

My invention relates to automatic control equipments and particularly to automatic control equipments for synchronous dynamo-electric machines.

One object of my invention is to provide a new, simple and improved control equipment of the type above referred to in which a plurality of electromagnetically actuated devices are interconnected and operated automatically in the proper sequence under all conditions to control the operation of a synchronous dynamo-electric machine.

Another object of my invention is to provide in an equipment of the type referred to a new and an improved arrangement for controlling the excitation of a synchronous dynamo-electric machine whereby the field winding is not excited with direct current, when the machine is being started, until after the speed of the machine has reached a predetermined value.

Another object of my invention is to provide in an equipment of the type referred to a new and an improved arrangement for preventing the equipment from operating to effect a re-start of the dynamo-electric machine in an improper manner when the speed of the machine is above a predetermined subnormal value.

A further object of my invention is to provide in an equipment of the type referred to a new and an improved arrangement for supplying a low and a high voltage to the armature winding of the dynamo-electric machine whereby the change over from the low voltage to the high voltage connections is effected automatically by the current through the field winding after the field circuit is completed.

My invention will be better understood from the following description taken in connection with the accompanying drawing, and its scope will be pointed out in the appended claims.

The accompanying drawing shows diagrammatically the apparatus and circuit connections employed in an automatic substation control equipment for a synchronous motor generator set in which my invention is embodied.

Referring to the drawing, 1 represents a motor generator comprising a synchronous motor 2 and a direct current generator 3.

The synchronous motor 2 is provided with an armature winding which is arranged to be supplied with current from any suitable source such as the three phase supply circuit $2^a$. In order to impress a reduced voltage upon the armature winding of the synchronous motor when the motor is being started a contactor 4 is provided which when energized connects the armature winding of the synchronous motor to the secondary terminals of a transformer 5 and the supply circuit $2^a$ to the primary terminals of the transformer. In order to impress normal voltage on the armature winding after the motor has been started a contactor 6 is provided which is arranged to connect the armature winding directly to the supply circuit $2^a$. Any other suitable switching means and transforming device however may be used to connect the armature winding to the supply circuit $2^a$ so that a low voltage and a high voltage is impressed upon the armature winding.

The motor 2 is also provided with a field winding which is connected to the discharge resistance 7 by means of the contacts 8 of a contactor 9 when the motor generator set 1 is shut down. The field winding of the motor is arranged to be connected to any suitable source of direct current such as the generator 3 when the coil 10 of the contactor 9 is energized.

The synchronous motors to which my invention particularly applies are of the type, commonly designated as "self-starting", in which the energized armature and the unexcited field structure act as an induction motor while starting from rest and accelerating. It is generally agreed that under average conditions of operation and power supply such motors can most suitably be started and placed in synchronous operating condition by the following procedure: First, energize the armature winding by a sufficient (but not excessive) fraction of the supply voltage, and allow the machine to accelerate to full speed; next, apply the exciting source to the field; and then as soon as the field has attained a suitable strength (typically at from one-half to two-thirds of the final value of field current) apply the full voltage of the supply, after which the field excitation is allowed to attain its normal working value. This is the procedure usually followed in manually-controlled synchronous motors.

The direct current generator 3 of the motor generator set is provided with a shunt field winding 11, which has connected in series therewith a resistance 12, and an armature winding which is arranged to be connected to the direct current load circuit 13 by any suitable switching means such as the contactor 14. A portion of the resistance 12 is arranged to be short circuited by means of a circuit, which includes the contacts 15 of a voltage relay 16, the coil 17 of which is connected across the terminals of the direct current generator, and the contacts 18 of the contactor 9, which are closed when the coil 10 of the contactor is not energized. The voltage relay 16 is so designed that it does not open its contacts 15 until the voltage of the generator 3 is about a predetermined value, thus insuring that the field of the generator will build up, and at a reasonably rapid rate, while the motor generator set is starting. The tap on the resistance 12 is adjusted so that a sufficient amount of resistance is short circuited to accelerate the building up of the generator voltage until it reaches a predetermined per cent of its normal value. Relay 16 then operates and inserts all of the resistance 12 in the circuit of the shunt field winding 11, thereby preventing the generator voltage from exceeding its normal value.

In order to start and stop the motor generator set under normal conditions a hand switch 20 is provided which when closed effects the starting of the set and when opened effects the stopping of the set. It is to be understood, however, that any other well known means, which may be either automatically or manually operated, may be used to determine the starting and stopping of the motor generator set. As shown in the drawing the closing of the switch 20 connects the coil 21 of the master relay 22 across the control circuit 23 which may be supplied from any suitable source of current such as the supply circuit 2$^a$. The energizing circuit of the coil 21 also includes the contacts 24 of a voltage relay 25, the coil 26 of which is connected across the terminals of the direct current generator 3. In the energizing circuit of the coil 21 there are also connected the contacts of the protective devices which are usually provided with automatic substation control equipments so that the relay 22 cannot operate unless all of the apparatus is in an operative condition. In order to simplify the drawing these protective devices have been omitted since they do not constitute a part of the present invention. Contacts are shown, however, 28$^A$ and 28$^B$, to indicate where the contacts of these protective devices may typically be connected. A protective device which can readily be built to handle sufficient current may be connected as indicated by 28$^A$. A protective device not readily capable of handling as great a current may be connected as indicated by 28$^B$.

The relay 25 is adjusted so that it opens its contacts 24 and closes its contacts 29 when the voltage of the generator 3, which is a function of the speed, builds up to a predetermined value above the value required to operate the voltage relay 16. Preferably the relay 25 is adjusted to respond to such a voltage that it does not open its contacts 24 until after the motor 2 has reached synchronous speed. The opening of the contacts 24 of the relay 25 does not deenergize the coil 21 of the master relay 22 when the coil 21 is energized because the contacts 30 of the master relay 22, which are closed when the coil 21 is energized, complete a shunt circuit around the contacts 24. The closing of the contacts 29 of the relay 25 connects the coil 10 of the contactor 9 across the control circuit 23 so that the field winding of the synchronous motor is connected across the terminals of the generator 3.

Another function of the relay 25 is to prevent the immediate reclosing of the master relay 22 after it has opened due to any cause, for example after a severe reduction and recovery of the alternating supply voltage. After the coil 21 of the master relay 22 has been sufficiently de-energized by any cause so that it opens its contacts, it cannot be re-energized until the speed of the motor generator set has decreased to such a subnormal value that the generator voltage is low enough to allow the relay 25 to close its contacts 24. Thus when the master relay coil 21 is re-energized by the closing of the contacts 24 the restarting operation of the equipment occurs in the proper manner. Preferably the drop out point of the relay 25 is much lower than the pick up point so that the proper restarting sequence is not initiated until the speed of the set has decreased below a predetermined subnormal value.

The closing of the main contacts 32 of the master relay 22 connects the coil 33 of the contactor 4 across the control circuit 23. The circuit of the coil 33 also includes the contacts 35 of the relay 36 and contacts 34 of the contactor 6 and may include contacts 28$^A$ of certain protective devices. The contacts 34 are closed when the coil 40 of the contactor 6 is de-energized. Therefore the contactor 4 can be closed only when the contactor 6 is open.

The relay 36 is provided with a coil 37 which is connected in series with the field winding of the motor 2 when the contactor 9 is closed. The relay 36 is designed so that it operates only in response to a predetermined value of direct current, preferably some value less than its normal value. Therefore when the direct current through the field winding of the motor reaches a predetermined value, the relay 36 opens its contacts 35 and closes its contacts 38. The opening of contacts 35 deenergizes the coil 33 of the contactor 4 which opens and disconnects the low voltage from the armature winding of the motor 2. As soon as the contactor 4 opens and closes its contacts 39 the coil 40 of the contactor 6 is connected across the control circuit 23. The circuit of the coil 40 may also include the contacts 28$^A$ of certain protective devices, and includes the main contacts 32 of the master relay 22 and the contacts 38 of the relay 36. Since the circuit of the coil 40 includes the contacts 39 of the contactor 4, the contactor 6 can be closed only when the contactor 4 is open. The closing of the contactor 6 connects the armature winding of the synchronous motor directly to the supply circuit 2$^a$ so that full voltage is impressed upon the armature winding.

The circuit of the coil 43 of the contactor 14, which controls the connection between the generator 3 and the load circuit 13, is arranged to be connected across the terminals of the generator 3 through contacts 44 of a direct current voltage equalizing relay 45, contacts 46 of the master relay 22, contacts 47 of a polarized relay 48 and contacts 49 of the contactor 6.

The direct current voltage equalizing relay is a differential relay comprising two coils 50 and 51. The coil 50 is connected across the load circuit 13 and the coil 51 is connected across the terminals of the generator 3 by means of the contacts 52 of the contactor 14 which are closed when the coil 43 of the contactor is not energized. The coils 50 and 51 are so arranged that the relay 45 closes its contacts 44 when the voltage of the generator exceeds the voltage of the circuit 13 by a predetermined amount. In order to keep the coil 43 of the contactor 14 energized after the contactor opens its contacts 52, the contactor is provided with the contacts 55, which complete a shunt circuit around the contacts 44 when the coil 43 is energized.

The contacts 46 of the master relay 22 are closed when the coil 21 is energized.

The coil 54 of the polarized relay 48 is connected across the terminals of the generator 3 and is so designed with a permanent field magnet that the relay closes its contacts 47 only when the direct current voltage of the generator is a predetermined value and in a predetermined direction. This relay prevents the coil 43 from being energized in case the generator voltage builds up in the wrong direction.

The contacts 49 of the contactor 6 are closed when the coil 40 is energized. Therefore it is evident that the generator 3 can be connected to the load circuit 13 only when the master relay 22 is energized, the running contactor 6 is closed, and the voltage of the generator is in the right direction and exceeds a predetermined value.

The generator 3 may be provided with any suitable means for protecting it against short circuits and overloads on the load circuit 13. Such means are not shown in the drawing, however, because they are well known in the art and do not constitute a part of my invention.

An equipment of the character above described should preferably be so protected that if a step of the sequence so fails as to leave the machines running or energized in an unsafe manner, such failure will be detected automatically and all necessary power circuits will be opened for the protection of the machines against damage. In my invention, as embodied herein, the only serious possibilities of damage by failure of sequence are either the failure of motor field excitation to build up, which in turn will prevent contactor 6 from closing, or the failure of contactor 4 to open although the motor field excitation may have been built up in due course. In either case this leaves motor 2 in operation and connected to the starting transformer 5.

Various means, known to the art, may be used to protect for this condition. One of these means which I prefer to use consists of a temperature-responsive device which operates one of the contacts 28$^A$ or 28$^B$ which has to be reset by hand. This device is exposed to the heat of the transforming means 5, preferably by physical contact with coils 5, preferably by physical contact with coils or core. If the motor 2 remains connected to the transforming means 5 for an excessive period, the heating of the transforming means 5 will cause this temperature-responsive device to open the contact controlled thereby so that the coil 21 of the relay is deenergized and effects the shutting down of the set in a manner hereinafter described.

The operation of the equipment shown in the drawing is as follows:

When the motor generator set is shut down and all of the apparatus is in an operative condition the different control devices are in the positions shown in the drawing. In order to start the motor generator set the switch 20 is closed. The closing of the switch 20 completes the circuit of the coil 21 of the master relay 22. The closing of the main contacts 32 of the master relay 22 completes the circuit of the coil 33 of the contactor 4 so that a low voltage is impressed upon the armature winding of the synchronous motor 2. The motor 2 then operates as an induction motor and as it increases in speed the voltage of the generator 3 builds up. When this voltage reaches a predetermined value the voltage relay 16 operates and removes the shunt circuit from around a portion of the resistance 12 so that the voltage does not thereafter build up too rapidly and does not go above its normal value. After the motor reaches synchronous speed and the direct current voltage of the generator builds up to a predetermined value the voltage relay 25 operates to open its contacts 24 and close its contacts 29. The opening of the contacts 24 does not deenergize the coil 21 of the master relay 22 because the contacts 30 have been previously closed. The closing of the contacts 29 of the relay 25 completes the circuit of the coil 10 of the contactor 9 so that the motor field winding is connected across the terminals of the generator 3. When the direct current in the field winding builds up to a predetermined value the relay 36 operates to open its contacts 35 and to close its contacts 38. The opening of the contacts 35 deenergizes the coil 33 of the contactor 4 so that the low voltage is disconnected from the armature winding of the motor 2. As soon as the contacts 39 of the contactor 4 are closed the circuit of the coil 40 of the contactor 6 is completed through the contacts 28 of the protective devices, contacts 32 of the master relay 22 and contacts 38 of the relay 35. The energization of the coil 40 closes the contactor 6 so that the armature winding of the motor 2 is connected directly to the supply circuit 2ª.

It is well known that when a synchronous motor attains its synchronous running condition by a sequence similar to that just described, the abrupt change from fractional supply voltage to full supply voltage impressed on the armature causes a transient disturbance in the field current. It has been found that the field current may thus reduce to zero for a fraction of a second. Since my invention uses for controlling one of the steps in the sequence, a relay operated by the rise of motor field current, this phenomenon tends to interrupt the continuity of the sequence. To overcome this difficulty in the simplest manner, the relay 36 is preferably of a type known in the art as a "hesitating" relay, which is sluggish in dropping out when deenergized, so that the relay will maintain its contacts closed through a transient disturbance of the kind referred to. The preferred type of "hesitating" relay obtains the hesitation by means of a low-resistance conductor which inductively delays changes of magnetic flux in the relay.

As soon as the voltage of the direct current generator 3 exceeds the voltage across the load circuit 13 by a certain amount the direct current voltage equalizing relay 45 closes its contacts 44. If the polarity of the generator 3 is correct, the polarized relay 48 closes its contacts 47 as soon as the voltage of the generator exceeds a predetermined value. Therefore if the voltage of the generator is above the predetermined value and is of the right polarity, when the contactor 6 closes its contacts 49, the circuit of the coil 43 of the contactor 14 is completed. The closing of the main contacts 56 of the contactor 14 connects the generator 3 across the load circuit 13. The closing of the contacts 55 of the contactor 14, when the coil 43 is energized, completes a holding circuit for the coil 43 which is independent of the contacts 44 of the relay 45, so that the coil 43 is not deenergized when the relay 45 opens its contacts, due to circuit of the coil 51 being open at the contacts 52.

The motor generator set is now in operation and the generator 3 assumes a portion of the load connected to the load circuit 13.

The motor generator set is shut down under normal conditions by opening the switch 20. This opens the circuit of the coil 21 of the master relay 22 which immediately opens its contacts 30, 32 and 46. The opening of the contacts 32 deenergizes the coil 40 of the contactor 6 so that this contactor opens and disconnects the armature winding of the motor from the supply circuit 2ª. The opening of contacts 46 deenergizes the coil 43 of the contactor 14 so that the generator 3 is disconnected from the load circuit 13. As soon as the speed of the motor generator has decreased below a predetermined subnormal value the voltage relay 25 opens its contacts 29, thereby deenergizing the coil 10 of the contactor 9, and closes its contacts 24. The opening of the contactor 9 disconnects the field winding of the motor from the terminals of the generator 3 and connects the discharge resistance 7 across the field winding. The opening of the contactor 9 also deenergizes the coil 37 of the relay 36 so that this relay closes its lower contacts 35. When the speed of the set has decreased to a still lower value, relay 16 closes its contacts 15 thereby completing the shunt circuit around a portion of the resistance 12. The motor generator set is now completely shut down awaiting the closing of the switch 20.

The shutting down of the motor generator set may also be effected by any one of the protective devices opening its respective contacts 28ᴬ or 28ᴮ in the circuit of the coil 21 of the master relay 22. The shutting down operation will be the same as above described. In case, however, the abnormal condition which causes the set to shut down is of a momentary character, the shutting down operation is the same as above described except that as soon as the speed of the motor generator set has decreased sufficiently to cause the voltage relay 26 to close its contacts 24, the master relay 22 is reenergized and the heretofore described starting operation is repeated.

If the field current of the motor fails after the set has been started, the relay 36 becomes deenergized and opens its contacts 38 so that the contactor 6 opens and closes its contacts 35 so that the contactor 4 is closed. After contactor 4 has remained closed for a certain length of time the temperature responsive means associated with the transforming means 5 operates to open the circuit of the coil 21 of the relay 22 so that the set is shut down in the manner above described. Therefore it is evident that relay 36 in addition to controlling the connection of the armature winding of the motor to the low voltage and high voltage connections, during the starting operation, also effects the shutting down of the set in case of a failure in the field current of the motor after the set has been started.

While I have shown and described only one embodiment of my invention, I do not desire to be limited thereto, but seek to cover in the appended claims all those modifications that fall within the true spirit and scope of my invention.

What I claim as new and desire to secure by Letters Patent of the United States, is:—

1. In combination, a source of alternating current, a dynamo-electric machine, automatic switching means comprising a plurality of devices arranged to operate automatically in a predetermined sequence to connect said machine to said source, control means adapted to be operated to effect the operation of said automatic switching means to connect said machine to said source, means adapted to be operated to effect the disconnection of said machine from said source, and means controlled by the speed of said machine for controlling said control means so as to prevent said control means from being operated to effect the operation of said automatic switching means until the speed of said motor has decreased below a predetermined subnormal speed after being disconnected from said source.

2. In combination, a source of alternating current, an alternating current motor, automatic switching means for controlling the connection between said source and said motor so that a relatively low voltage is impressed on said motor to start it, and a relatively high voltage is impressed on said motor after it has been started, means for effecting the disconnection of said motor from said source, and means controlled by the speed of said motor for permitting said automatic switching means to effect a reconnection of said motor to said source after it has been disconnected from said source only when the speed of the motor is subnormal.

3. In combination, a source of alternating current, an alternating current motor, automatic switching means for controlling the connection between said source and said motor so that a relatively low voltage is impressed on said motor to start it and a relatively high voltage is impressed on said motor after the speed of the motor has reached a predetermined value, means for effecting the disconnection of said motor from said source, and means controlled by the speed of said motor for permitting said automatic switching means to effect a reconnection of said motor to said source after it has been disconnected from said source only when the speed of said motor is below said predetermined value.

4. In combination, a source of alternating current, a synchronous dynamo-electric machine, automatic switching means for connecting said machine to said source, a master relay arranged when energized to effect the operation of said automatic switching means to connect said machine to said source to start said machine and when deenergized to effect the operation of said automatic switching means to disconnect said machine from said source to stop said machine, and an energizing circuit for said master relay arranged to be completed only when the speed of said machine is subnormal.

5. In combination, a source of alternating current, a synchronous dynamo-electric machine, automatic switching means for connecting said machine to said source, a master relay arranged when energized to effect the operation of said automatic switching means to connect said machine to said source to start said machine and when deenergized to effect the operation of said automatic switching means to disconnect said machine from said source to stop said machine, an energizing circuit for said master relay, a generator driven by said machine, and contacts in said energizing circuit arranged to be closed only when the voltage of said generator is below a predetermined value.

6. In combination, a source of alternating current, an alternating current dynamo-electric machine, switching means arranged to connect said machine to said source, electromagnetically operated means adapted when energized to effect the operation of said switching means, a circuit for said electromagnetically operated means, contacts in said circuit arranged to be closed only when the speed of said machine is subnormal, and contacts connected in multiple with said first mentioned contacts and arranged to be closed when said electromagnetically operated means is energized.

7. In combination, a source of alternating current, a synchronous-dynamo electric machine, switching means arranged to connect the armature winding of said machine to said alternating current source, electromagnetically operated means adapted when energized to effect the operation of said switching means, an energizing circuit for said electromagnetically operated means, a direct current generator driven by said machine, electromagnetically operated switching means adapted to connect the field winding of said machine to said generator, and means responsive to the voltage of said generator for controlling said energizing circuit and said electromagnetically operated switching means.

8. In combination, a source of alternating current, a synchronous dynamo-electric machine, switching means arranged to connect the armature winding of said machine to said alternating current source, electromagnetically operated means adapted when energized to effect the operation of said switching means, an energizing circuit for said electromagnetically operated means, a direct current generator driven by said machine, electromagnetically operated switching means adapted to connect the field winding of said machine to said generator, and means responsive to the voltage of said generator adapted to prevent the closing of said energizing circuit and to effect the operation of said electromagnetically operated switching means when the voltage of said generator exceeds predetermined values.

9. In combination, a source of alternating current, a cynchronous dynamo-electric machine, switching means arranged to connect the armature winding of said machine to said alterating current source, electromagnetically operated means adapted when energized to effect the operation of said switching means, an energizing circuit for said electromagnetically operated means, a direct current generator driven by said machine, electromagnetically operated switching means adapted to connect the field winding of said machine to said generator, a circuit for said electromagnetically operated switching means, a relay responsive to the voltage of said generator, and contacts in said energizing circuit and said last mentioned circuit controlled by said voltage relay.

10. In combination, a source of alternating current, an alternating current dynamo-electric machine having an armature winding and a field winding, switching means arranged to connect the armature winding of said machine to said source whereby a low voltage is impressed thereon, switching means arranged to connect the armature winding to said source whereby a high voltage is impressed thereon, means operative to effect the operation of said first mentioned means, a source of direct current, means arranged to connect said source of direct current to said field winding after the operation of said first mentioned switching means, and means arranged to effect the operation of said second mentioned switching means when the direct current through said field winding builds up to a predetermined value, which is less than the normal operating value.

11. In combination, a source of alternating current, an alternating current dynamo-electric machine having an armature winding and a field winding, switching means arranged to connect the armature winding of said machine to said source whereby a low voltage is impressed thereon, switching means arranged to connect the armature winding to said source whereby a high voltage is impressed thereon, means operative to effect the operation of said first mentioned means, means arranged to supply direct current to said field winding after the operation of said first mentioned switching means, and a time delay relay responsive to the direct current through said field winding for controlling the operation of both of said switching means.

12. In combination, a source of alternating current, an alternating current dynamo-electric machine having an armature winding and a field winding, switching means arranged to connect said armature winding to said source whereby a low voltage is impressed thereon, switching means arranged to connect said armature winding to said source whereby a high voltage is impressed thereon, a direct current generator driven by said machine, a relay arranged when energized to effect the operation of said first mentioned switching means, an energizing circuit for said relay, contacts in said energizing circuit, electromagnetically operated means arranged to connect said generator to said field winding, a circuit for said electromagnetically operated means, contacts in said last mentioned circuit, means operative in response to the voltage of said generator for operating said contacts, and means operative in response to a predetermined amount of direct current in said field winding to effect the operation of said second mentioned switching means.

In witness whereof, I have hereunto set my hand this 13th day of September, 1922.

MAX A. WHITING.